US011787334B2

(12) United States Patent
Ding et al.

(10) Patent No.: US 11,787,334 B2
(45) Date of Patent: Oct. 17, 2023

(54) DRIVER ASSISTANCE SYSTEM AND METHOD FOR VEHICLE FLANK SAFETY

(71) Applicant: Volvo Car Corporation, Gothenburg (SE)

(72) Inventors: Sihao Ding, Mountain View, CA (US); Andreas Wallin, Billdal (SE); Megha Maheshwari, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/559,820

(22) Filed: Sep. 4, 2019

(65) Prior Publication Data
US 2020/0070725 A1 Mar. 5, 2020

Related U.S. Application Data

(60) Provisional application No. 62/727,270, filed on Sep. 5, 2018.

(51) Int. Cl.
*B60R 1/00* (2022.01)
*B60W 50/16* (2020.01)
*B60W 30/095* (2012.01)
*G06V 20/58* (2022.01)
*B60W 50/14* (2020.01)

(52) U.S. Cl.
CPC ........... *B60R 1/00* (2013.01); *B60W 30/0953* (2013.01); *B60W 50/16* (2013.01); *G06V 20/58* (2022.01); *B60R 2300/301* (2013.01); *B60R 2300/802* (2013.01); *B60W 2050/146* (2013.01)

(58) Field of Classification Search
None
See application file for complete search history.

(56) References Cited

U.S. PATENT DOCUMENTS

| 5,550,677 A | 8/1996 | Schofield et al. |
| 5,670,935 A | 9/1997 | Schofield et al. |
| 7,161,616 B1 * | 1/2007 | Okamoto .............. G06T 3/4038 348/148 |

(Continued)

FOREIGN PATENT DOCUMENTS

| DE | 10226278 A1 | 12/2003 |
| FR | 2982552 A1 | 5/2013 |

(Continued)

OTHER PUBLICATIONS

Nov. 21, 2019 Extended European Search Report issued on International Application No. 19195141.

*Primary Examiner* — Chikaodili E Anyikire
(74) *Attorney, Agent, or Firm* — Clements Bernard Walker; Christopher L. Bernard

(57) ABSTRACT

The present invention relates to a driver assistance (DA) system and method for vehicle flank safety. This system and method also have utility in autonomous driving (AD) applications. The system and method optionally pair one or more cameras with one or more proximity sensors to provide free space awareness and contact avoidance related to the flank of a vehicle, providing a virtual distance grid overlay on one or more camera views available to an operator, predefined safety boundary intrusion detection under low-speed maneuvering conditions, door-open obstruction and danger detection, and a flank illumination system.

18 Claims, 7 Drawing Sheets

(56) References Cited

U.S. PATENT DOCUMENTS

| | | | |
|---|---|---|---|
| 9,315,151 B2 | 4/2016 | Taylor et al. | |
| 2009/0259401 A1 | 10/2009 | Edwards et al. | |
| 2010/0194861 A1* | 8/2010 | Hoppenstein | H04N 13/229 |
| | | | 348/48 |
| 2013/0002861 A1* | 1/2013 | Mitsugi | G06K 9/00812 |
| | | | 348/135 |
| 2013/0155240 A1 | 6/2013 | Mitsuta et al. | |
| 2015/0009010 A1* | 1/2015 | Biemer | G01G 19/44 |
| | | | 340/5.83 |
| 2015/0022664 A1* | 1/2015 | Pflug | G06F 3/017 |
| | | | 348/148 |
| 2015/0077560 A1* | 3/2015 | Zhang | G06K 9/00805 |
| | | | 348/148 |
| 2015/0165972 A1* | 6/2015 | Takemae | G06T 7/593 |
| | | | 348/148 |
| 2015/0266509 A1* | 9/2015 | Ignaczak | B60W 50/14 |
| | | | 701/1 |
| 2016/0001701 A1 | 1/2016 | Pagliani et al. | |
| 2016/0044284 A1* | 2/2016 | Goseberg | G06F 3/012 |
| | | | 348/148 |
| 2016/0078305 A1* | 3/2016 | Higgins-Luthman | H04N 7/18 |
| | | | 348/118 |
| 2017/0162042 A1* | 6/2017 | Dooley | G08G 1/16 |
| 2017/0220878 A1* | 8/2017 | Lakatos | G06T 7/579 |
| 2017/0232890 A1* | 8/2017 | Lewis | B60Q 9/002 |
| | | | 348/148 |
| 2017/0343799 A1* | 11/2017 | Ito | G02B 27/0101 |
| 2018/0012085 A1* | 1/2018 | Blayvas | G06T 7/70 |
| 2018/0191954 A1* | 7/2018 | Pan | H04N 13/246 |
| 2018/0209122 A1* | 7/2018 | Kiyota | G08B 13/19641 |
| 2020/0070725 A1* | 3/2020 | Ding | B60W 50/16 |

FOREIGN PATENT DOCUMENTS

| | | |
|---|---|---|
| WO | 2016178190 A1 | 11/2016 |
| WO | 2017078001 A1 | 5/2017 |

* cited by examiner

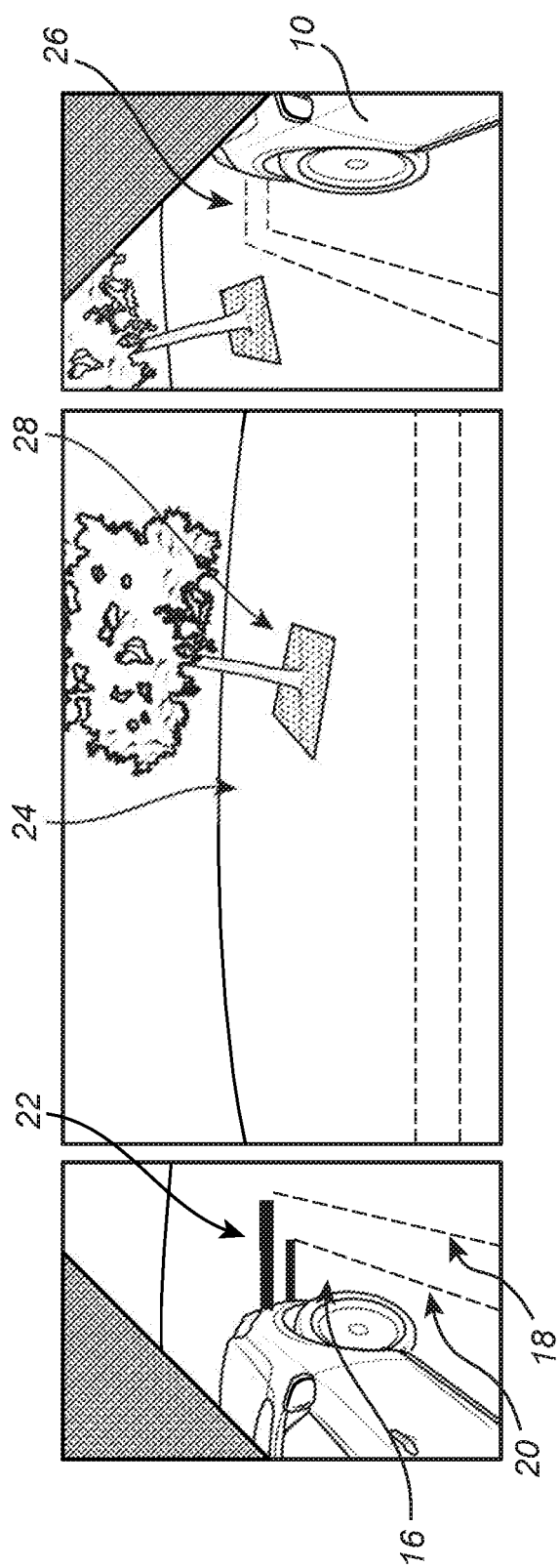

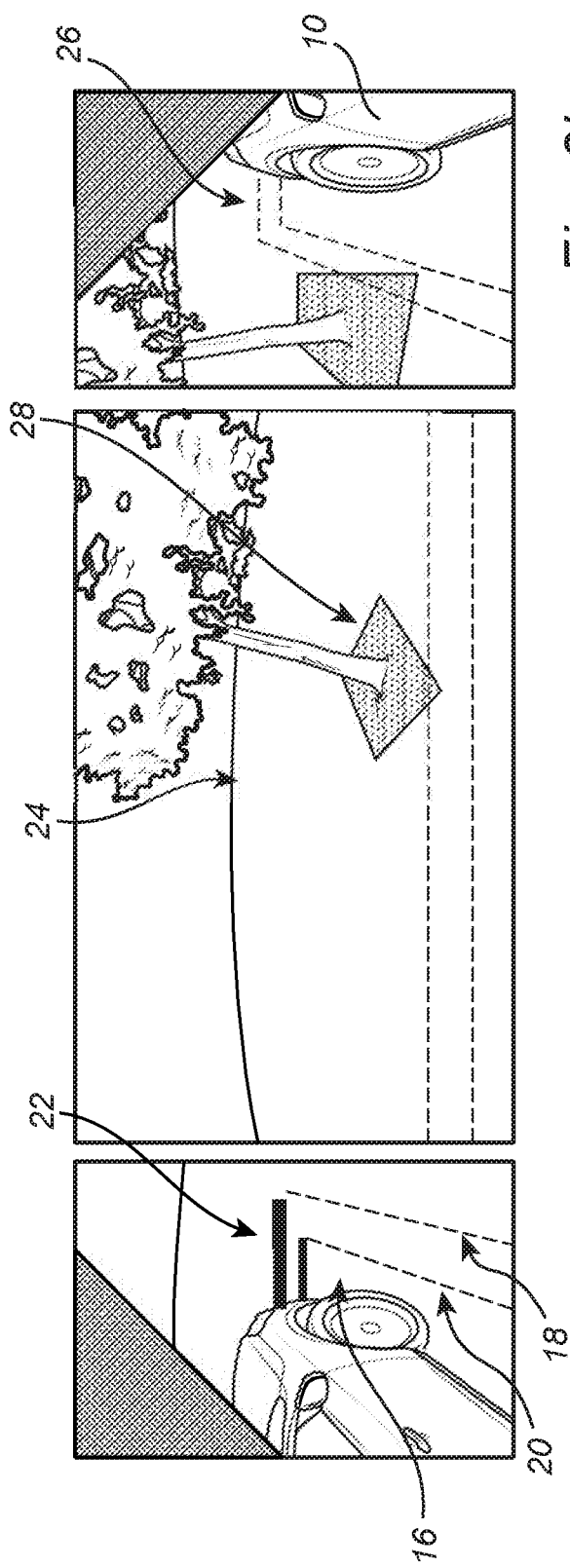

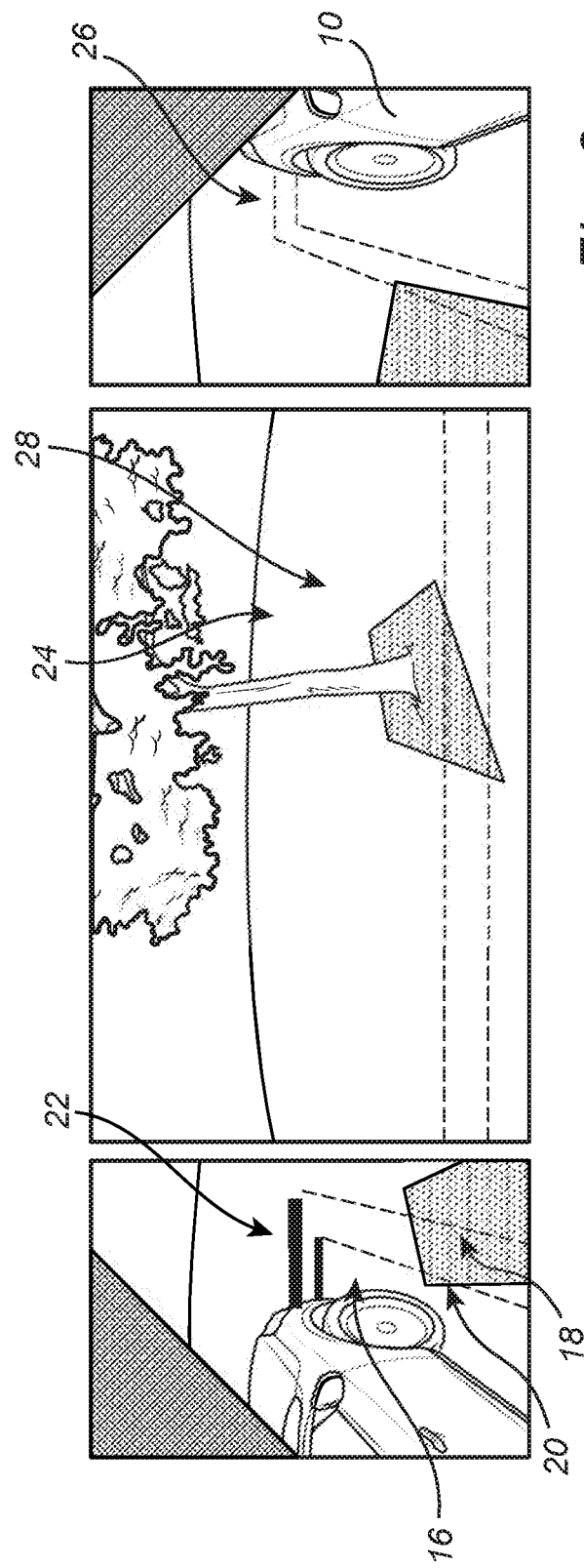

DRIVER ASSISTANCE SYSTEM AND METHOD FOR VEHICLE FLANK SAFETY

CROSS-REFERENCE TO RELATED APPLICATION

The present disclosure claims the benefit of priority of co-pending U.S. Provisional Patent Application No. 62/727,270, filed on Sep. 5, 2018, and entitled "DRIVER ASSISTANCE SYSTEM AND METHOD FOR VEHICLE FLANK SAFETY," the contents of which are incorporated in full by reference herein.

FIELD OF THE INVENTION

The present invention relates generally to the automotive and active safety fields. More specifically, the present invention relates to a driver assistance (DA) system and method for vehicle flank safety. This system and method also have utility in autonomous driving (AD) applications. The system and method optionally pair one or more cameras with one or more proximity sensors to provide free space awareness and contact avoidance related to the flank of a vehicle, providing a virtual distance grid overlay on one or more camera views available to an operator, predefined safety boundary intrusion detection under low-speed maneuvering conditions, door-open obstruction and danger detection, and a flank illumination system.

BACKGROUND OF THE INVENTION

The use of cameras to obtain surrounding views of a vehicle is well known to persons of ordinary skill in the art. It is also well known to persons of ordinary skill in the art to provide a virtual distance grid overlay on a rear camera view available to an operator when backing up a vehicle. It is further well known to persons of ordinary skill in the art to detect objects and obstacles within a predefined safety boundary in front of and/or behind a vehicle using proximity sensors, such as sonar, radar, and/or lidar. However, such proximity sensors are typically mounted near the corner of a vehicle and do not provide full flank coverage.

Thus, an object of the present invention is to provide 360-degree visual assistance to the operator of a vehicle, especially with respect to the flank of a vehicle, as well as predefined safety boundary intrusion detection to the flank of the vehicle under low-speed maneuvering conditions—with either a camera only or a camera-proximity sensor combination. An object of the present invention is also to use this predefined flank safety boundary to assess the safety of opening a door in a given situation, given the detected presence/absence of a stationary or approaching object or obstacle. An object of the present invention is further to provide or trigger flank illumination under given circumstances, such that flank visibility and imaging is improved.

BRIEF SUMMARY OF THE INVENTION

In various aspects, the present invention provides a DA system and method for vehicle flank safety. This system and method also have utility in AD applications. The system and method optionally pair one or more cameras with one or more proximity sensors to provide free space awareness and contact avoidance related to the flank of a vehicle, providing a virtual distance grid overlay on one or more camera views available to an operator, predefined safety boundary intrusion detection under low-speed maneuvering conditions, door-open obstruction and danger detection, and a flank illumination system.

As used herein, "flank" refers, collectively, to the left and right surfaces of a vehicle, corresponding to the doors and side windows, as shown in FIG. 1, which includes the left flank 12 and the right flank 14 of the vehicle 10.

As used herein, "proximity intrusion" refers to situations in which objects/obstacles fall within a predetermined safety envelope surrounding the vehicle 10, which may cause undesired contact and collision with the vehicle 10. FIG. 2 shows a virtual distance grid 16 surrounding the vehicle, including an outer boundary 18 and an inner boundary 20. For example, when parking in a narrow garage, the doorframe of the garage may intrude into the proximity of the left flank 12 (FIG. 1) or the right flank 14 (FIG. 1) of the vehicle and cause scratches and/or a dent.

As used herein, "proximity sensor" refers to a sensor that reports distance to an object/obstacle as an output, such as a sonar/ultrasound sensor, radar, lidar, etc.

As used herein, "low-speed maneuvering" refers to maneuvering under 10 mph.

In one specific aspect, the present invention provides a vehicle system for displaying and detecting objects/obstacles in a flank of a vehicle, including: one or more cameras operable for obtaining one or more images of the flank of the vehicle; an algorithm operable for removing distortion from the one or more images, transforming the one or more images, and overlaying a virtual distance grid on the one or more images for presentation to an operator on a display disposed within the vehicle; means for detecting an object/obstacle within a predefined virtual safety envelope defined one or more of adjacent to and around the vehicle and including the flank of the vehicle; and a warning system operable for alerting the operator to the object/obstacle within the predefined virtual safety envelope defined one or more of adjacent to and around the vehicle and including the flank of the vehicle. Transforming the one or more images includes rotationally transforming the one or more images. Optionally, the one or more images include a plurality of images each capturing a portion of the flank of the vehicle. The virtual distance grid is derived from at least one of a calibration parameter and a look-up table. The virtual distance grid includes at least one zone relatively closer to the vehicle and at least one zone relatively farther from the vehicle. The means for detecting the object/obstacle include one or more of the one or more cameras and a proximity sensor. The warning system includes one or more of a visual warning system, an auditory warning system, and a haptic warning system. The algorithm is further operable for determining and displaying one or more of a present orientation of the vehicle and a future orientation of the vehicle on the one or more images displayed to the operator. The algorithm is further operable for detecting and alerting the operator to a potential interaction between the object/obstacle and a door of the vehicle when open based on a predetermined or expected opening distance of the vehicle. The algorithm is further operable for detecting and predicting a potential incursion of a moving object/obstacle into the flank of the vehicle and alerting the operator thereto such that the operator does not unsafely exit the vehicle. The system further includes an illumination system operable for selectively illuminating the flank of the vehicle such that the one or more images can be obtained when one or more of: a low illumination condition is detected and the one or more cameras are activated.

In another specific aspect, the present invention provides a vehicle method for displaying and detecting objects/obstacles in a flank of a vehicle, including: obtaining one or more images of the flank of the vehicle using one or more cameras; removing distortion from the one or more images, transforming the one or more images, and overlaying a virtual distance grid on the one or more images for presentation to an operator on a display disposed within the vehicle; detecting an object/obstacle within a predefined virtual safety envelope defined one or more of adjacent to and around the vehicle and including the flank of the vehicle; and alerting the operator to the object/obstacle within the predefined virtual safety envelope defined one or more of adjacent to and around the vehicle and including the flank of the vehicle using a warning system. Transforming the one or more images includes rotationally transforming the one or more images. Optionally, the one or more images include a plurality of images each capturing a portion of the flank of the vehicle. The virtual distance grid is derived from at least one of a calibration parameter and a look-up table. The virtual distance grid includes at least one zone relatively closer to the vehicle and at least one zone relatively farther from the vehicle. The detecting the object/obstacle includes using one or more of the one or more cameras and a proximity sensor. The warning system includes one or more of a visual warning system, an auditory warning system, and a haptic warning system. The method further includes determining and displaying one or more of a present orientation of the vehicle and a future orientation of the vehicle on the one or more images displayed to the operator. The method further includes detecting and alerting the operator to a potential interaction between the object/obstacle and a door of the vehicle when open based on a predetermined or expected opening distance of the vehicle. The method further includes detecting and predicting a potential incursion of a moving object/obstacle into the flank of the vehicle and alerting the operator thereto such that the operator does not unsafely exit the vehicle. The method further includes selectively illuminating the flank of the vehicle such that the one or more images can be obtained when one or more of: a low illumination condition is detected and the one or more cameras are activated.

In a further specific aspect, the present invention provides a vehicle, including: one or more cameras operable for obtaining one or more images of the flank of the vehicle; an algorithm operable for removing distortion from the one or more images, transforming the one or more images, and overlaying a virtual distance grid on the one or more images for presentation to an operator on a display disposed within the vehicle; means for detecting an object/obstacle within a predefined virtual safety envelope defined one or more of adjacent to and around the vehicle and including a flank of the vehicle; and a warning system operable for alerting the operator to the object/obstacle within the predefined virtual safety envelope defined one or more of adjacent to and around the vehicle and including the flank of the vehicle. The means for detecting the object/obstacle include one or more of the one or more cameras and a proximity sensor.

BRIEF DESCRIPTION OF THE DRAWINGS

The present invention is illustrated and described herein with reference to the various drawings, in which like reference numbers are used to denote like system components/method steps, as appropriate, and in which:

FIGS. 3a-c are schematic views illustrating exemplary flank camera views overlaid with a virtual distance grid in accordance with the system and method of the present invention;

DETAILED DESCRIPTION OF THE INVENTION

Again, in various aspects, the present invention provides a DA system and method for vehicle flank safety. This system and method also have utility in AD applications. The system and method optionally pair one or more cameras with one or more proximity sensors to provide free space awareness and contact avoidance related to the flank of a vehicle, providing a virtual distance grid overlay on one or more camera views available to an operator, predefined safety boundary intrusion detection under low-speed maneuvering conditions, door-open obstruction and danger detection, and a flank illumination system.

Figure 1:
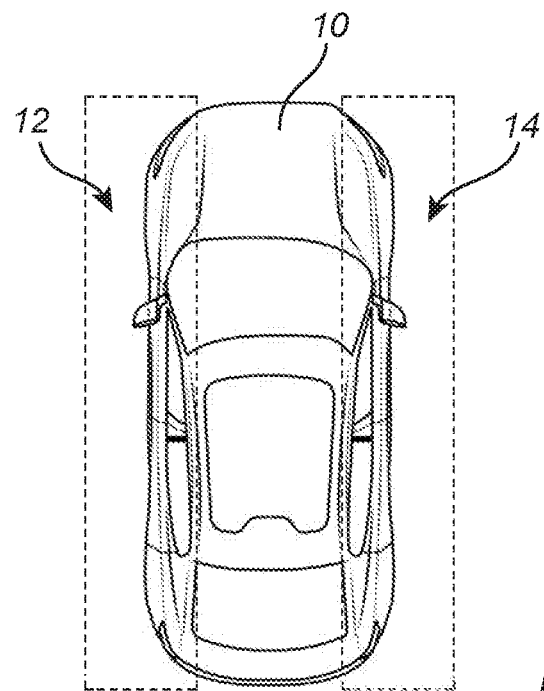
FIG. 1 is a schematic view illustrating the left flank and the right flank of a vehicle, both covered by the system and method of the present invention.
Figure 2:
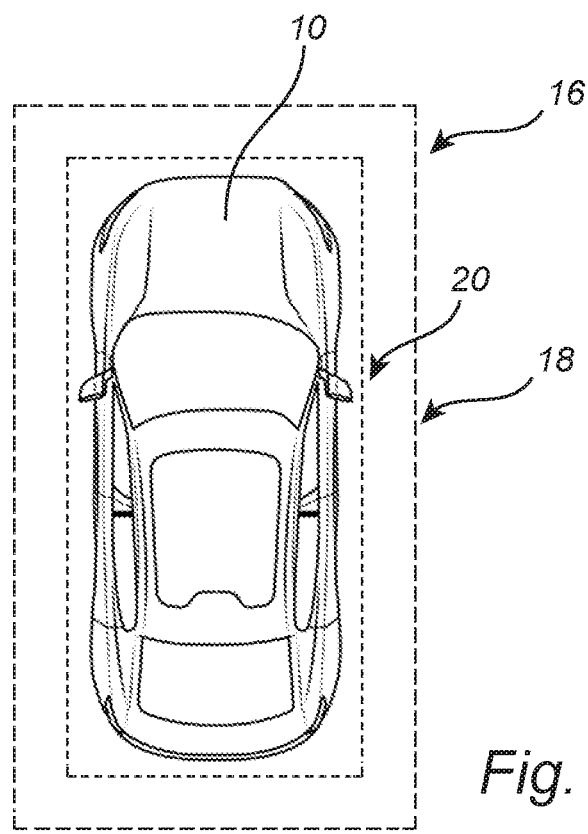
FIG. 2 is a schematic view illustrating a virtual distance grid around the vehicle, used to trigger the proximity intrusion detection warning of the present invention.

The system and method of the present invention perform three primary functions. First, a virtual distance grid 16 (FIG. 2) is overlaid on a flank-view camera display to provide visual assistance to an operator such that he or she has better distance/free space awareness. Second, automatic proximity intrusion detection provides a warning when an object/obstacle falls within a predetermined distance from the vehicle 10 (FIGS. 1 and 2), thereby providing enhanced collision avoidance under low-speed maneuvering conditions. Third, operator information, such as yaw and steering wheel angle, is used to display the current and predicted position and orientation of the vehicle 10, with the overlaid virtual distance grid 16, further enhancing collision avoidance under low-speed maneuvering conditions.

Referring now specifically to FIGS. 2 and 3a-c, in accordance with the system and method of the present invention, one or more flank camera images 22, 24, and 26 are provided and displayed to the operator after distortions are removed and rotational transformation or the like is performed. In the exemplary embodiment illustrated, three sub-images 22, 24, and 26 are provided and displayed, including a front-wheel view 22, a side view 24, and a rear-wheel view 26, all proximate the near-flank 12 or 14 of the vehicle. It will be readily apparent to persons of ordinary skill in the art that other views could be provided equally. For example, bird's-eye-views (BEVs) could be provided. These views may be switched or combined as desired. The virtual distance grid 16 is overlaid on each of the sub-images 22, 24, and 26 using calibration parameters and/or look-up tables. Such techniques are well known to persons of ordinary skill in the art. Here, the sub-images 22, 24, and 26 show an object/obstacle 28 outside of both the outer boundary 18 and the inner boundary 20 of the virtual distance grid 16, the object/ obstacle 28 between the outer boundary 18 and the inner boundary 20 of the virtual distance grid 16, and the object/obstacle 28 inside both the outer boundary 18 and the inner boundary 20 of the virtual distance grid 16, respectively. The immediate next position of the vehicle 10 is predicted based on yaw angle, steering wheel angle, and the like, which information may also be displayed on the sub-mages 22, 24, and 26.

Figure 4A:
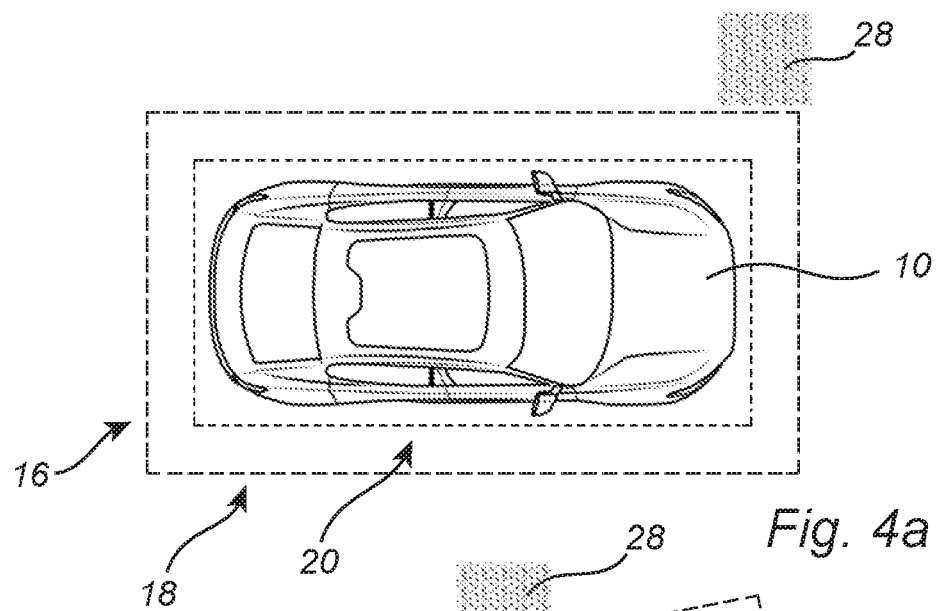
FIGS. 4a-c are schematic views illustrating the intrusion of an object/obstacle into the predetermined safety margin surrounding the vehicle, thereby potentially causing damage to the vehicle.
Figure 4B:
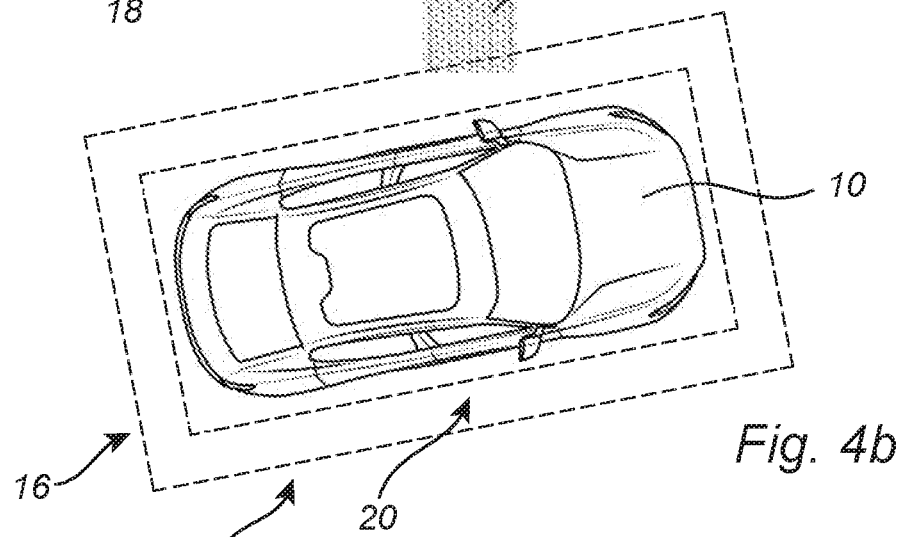
Figure 4C:
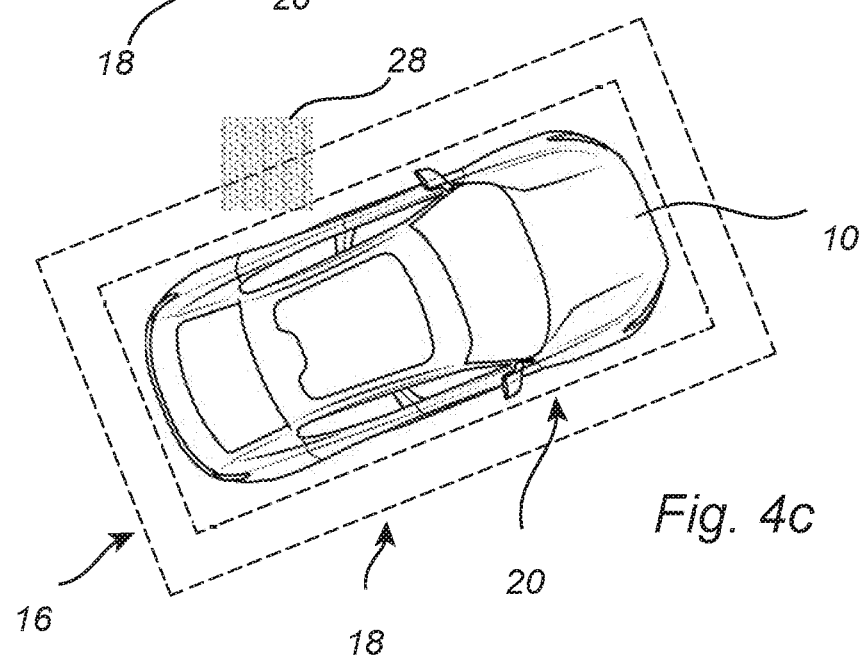

As is done conventionally for back-up maneuvering, algorithms are used in conjunction with the camera(s) and/or proximity sensor(s) to detect/predict intrusions into the virtual distance grid 16. FIGS. 4a-c shows an object/obstacle 28 outside of both the outer boundary 18 and the inner boundary 20 of the virtual distance grid 16, the object/obstacle 28 between the outer boundary 18 and the inner boundary 20 of the virtual distance grid 16, and the object/obstacle 28 inside both the outer boundary 18 and the inner boundary 20 of the virtual distance grid 16, respectively. The present invention utilizes obtained object/obstacle distance information, such as that related to nearby parked vehicles, combined with maximum door open angle information to alert an operator to potential impacts when a door is opened or the like. Similarly, the operator may be warned of moving vehicles, bicycles, pedestrians, etc. approaching the near-flank 12 and 14 (FIG. 1) of the vehicle 10. Finally, suitable ground illumination may be provided when the cameras/proximity sensors of the present invention are activated.

Figure 5:
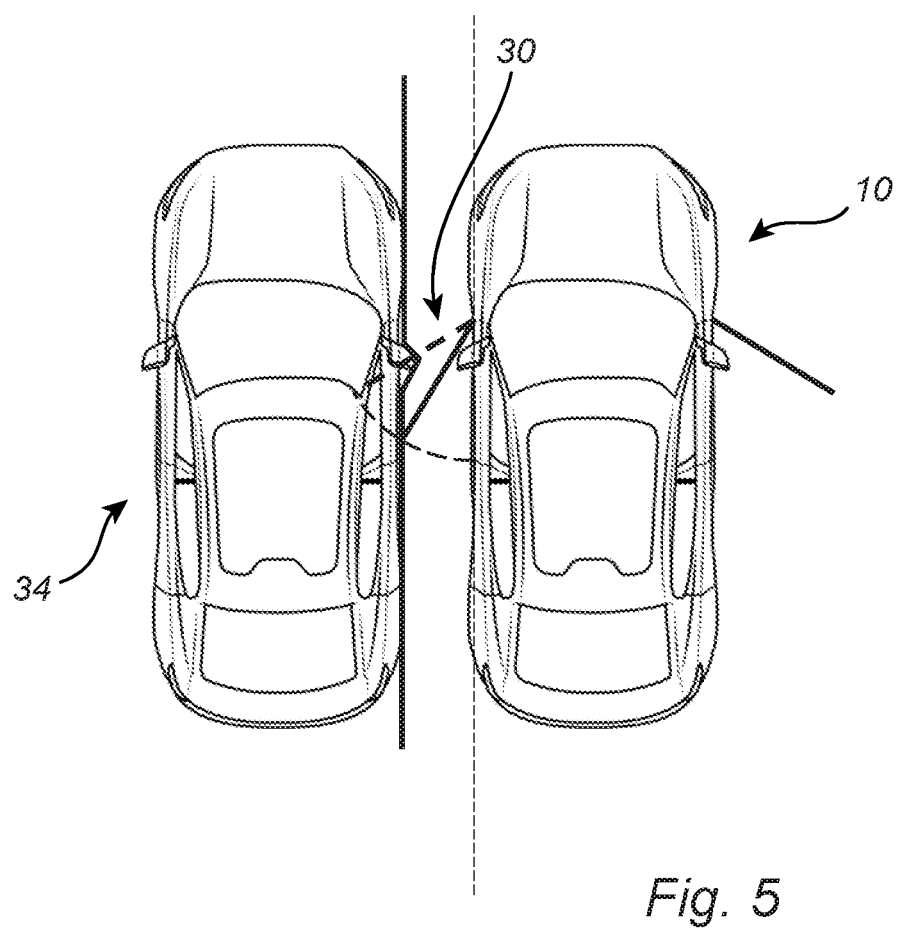
FIG. 5 is a schematic view illustrating the functionality of the door impact warning system of the present invention.
Figure 6:
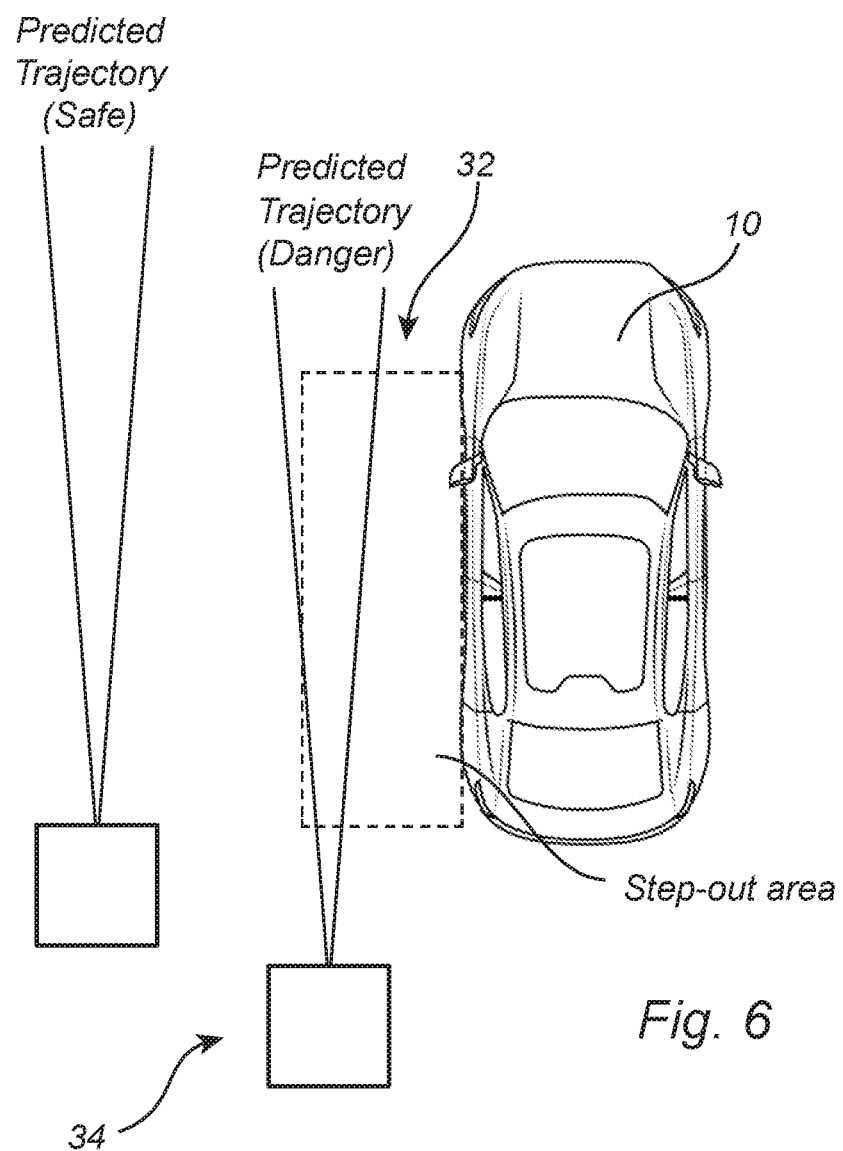
FIG. 6 is a schematic view illustrating the functionality of the exit danger warning system of the present invention.

Referring now specifically to FIGS. 5 and 6, the protection associated with exiting a vehicle 10 is two-fold: (1) door-open protection and (2) exit danger warning. Broadly speaking, door-open protection ensures the process of opening the door 30 without slamming it into other objects, such as nearby parked vehicles 34, and exit danger warning ensures the process of opening the door 30 and/or stepping out of the vehicle 10 without being hit by incoming moving objects, such as a vehicle or a cyclist 34 from the rear-flank. These two functions are closely related as they both affect when it is safe to open the door 30 and step out of the vehicle 10, and how much the door 30 be opened safely.

It should be emphasized that these functions could be activated and deactivated by manual instruction in a manner similar to how window/door locks in today's vehicles work, in order to prevent unwanted obstruction of the door 30. These functions should also be disabled in case a collision is detected, for example, when the airbag is activated, to prevent passengers from being locked in the vehicle while not able to manually deactivate them. It is recommended that these functions are only activated when the vehicle is parked (in P gear).

Once enabled, the free space at the flanks are estimated based on algorithms that operate on data from the camera(s) and proximity sensor(s). Based on the estimated free space, the maximum door-open angle is calculated, such that the operational area of the door does not overlap with any non-free space.

For the exit danger warning, an extra layer of moving object detection is added besides the free space estimation. The nearby moving objects 34 are detected and tracked with the camera(s) and proximity sensors(s) using machine learning algorithms. Their speeds are estimated and the future trajectories are predicted. Once enabled, the system will calculate whether the operational area of door opening, as well as the (pre-defined) possible stepping out area 32 will be crossed by any of the trajectories of the nearby moving objects 34. If so, an appropriate alert is given.

Many conventional vehicles have surrounding illuminations for aesthetic purposes. Many safety features, especially ones require the use of camera(s), will not work ideally without proper illumination. For example, camera-based parking line detection, lane detection, object detection, as well as the applications currently being described would benefit from added illumination. In order to make vehicles safe in both day time and night time conditions, both outdoor and indoor, flank illumination is thus important. To save energy, flank illumination should not be activated all the time. In the present invention, flank illumination is activated when at least the following two criteria are met simultaneously:

1. Low illumination is detected. For this, the same technology as automatic headlights is utilized.
2. Surround/flank cameras are activated. This could be either manually or automatically triggered by other features in the vehicle.

Preferably, the software application/algorithm/method of the present invention is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. Input/output (I/O) interfaces can be used to receive user input and/or for providing system output. User input can be provided via, for example, a keypad, a touch screen, a scroll ball, a scroll bar, buttons, a voice-activation system, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables the user to interact with the memory. Additionally, the I/O interfaces may further include an imaging device, i.e. the camera(s), etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Thus, in various aspects, the present invention provides a DA system and method for vehicle flank safety. This system and method also have utility in AD applications. The system and method optionally pair one or more cameras with one or more proximity sensors to provide free space awareness and contact avoidance related to the flank of a vehicle, providing a virtual distance grid overlay on one or more camera views available to an operator, predefined safety boundary intrusion detection under low-speed maneuvering conditions, door-open obstruction and danger detection, and a flank illumination system.

Although the present invention is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle system for displaying and detecting objects/obstacles in a flank of a vehicle, comprising:
    a plurality of cameras operable for obtaining a plurality of separate images of the flank of the vehicle, wherein the plurality of separate images of the flank of the vehicle comprise a side-facing image of the flank of the vehicle, a front-wheel view of the flank of the vehicle, and a rear-wheel view of the flank of the vehicle;
    an algorithm operable for removing distortion from the plurality of separate images, transforming the plurality of separate images, and overlaying a virtual distance grid simultaneously and consistently on each of the plurality of separate images including the side-facing image of the flank of the vehicle, the front-wheel view of the flank of the vehicle, and the rear-wheel view of the flank of the vehicle on a display in the vehicle;
    means for detecting an object/obstacle within a predefined virtual safety envelope defined one or more of adjacent to and around the vehicle, wherein the means for detecting the object/obstacle comprise one or more of the plurality of cameras and a proximity sensor; and
    a warning system operable for alerting the operator to the object/obstacle within the predefined virtual safety envelope defined one or more of adjacent to and around the vehicle;
    wherein the plurality of separate images each capture an overlapping portion of the flank of the vehicle, and wherein the virtual distance grid is derived from at least one of a calibration parameter and a look-up table such that the virtual distance grid is simultaneously and consistently overlaid and displayed across the plurality of separate images; and
    wherein the algorithm is further operable for:
        predicting an immediate next position of the vehicle based on yaw angle or steering wheel angle and displaying the immediate next position consistently on each of the plurality of separate images simultaneously;
        determining that the vehicle is in a parked gear and detecting and alerting the operator to a potential interaction between the object/obstacle and a door of the vehicle when the door is opened when the vehicle is in the parked gear based on a predetermined or expected opening distance of the door, wherein the determining that the vehicle is in the parked gear and detecting and alerting the operator to the potential interaction between the object/obstacle and the door of the vehicle when the door is opened when the vehicle is in the parked gear based on the predetermined or expected opening distance of the door is disabled when airbag activation is detected; and
        determining that the vehicle is in the parked gear and detecting and predicting a potential incursion of a moving object/obstacle into the flank of the vehicle when the vehicle is in the parked gear and alerting the operator.

2. The vehicle system of claim 1, wherein transforming the plurality of separate images comprises rotationally transforming the plurality of separate images.

3. The vehicle system of claim 1, wherein the plurality of separate images are displayed with the side-facing image of the flank of the vehicle disposed between the front-wheel view of the flank of the vehicle and the rear-wheel view of the flank of the vehicle.

4. The vehicle system of claim 1, wherein the virtual distance grid comprises at least one zone relatively closer to the vehicle and at least one zone relatively farther from the vehicle both displayed to a driver on the display in the vehicle, wherein the at least one zone relatively closer to the vehicle and the at least one zone relatively farther from the vehicle are both consistently overlaid and displayed across the plurality of separate images.

5. The vehicle system of claim 1, wherein the warning system comprises one or more of a visual warning system, an auditory warning system, and a haptic warning system.

6. The vehicle system of claim 1, wherein the algorithm is further operable for determining and displaying one or more of a present orientation of the vehicle and a future orientation of the vehicle on the plurality of separate images displayed to the operator.

7. The vehicle system of claim 1, wherein the determining that the vehicle is in the parked gear and detecting and predicting the potential incursion of the moving object/obstacle into the flank of the vehicle when the vehicle is in the parked gear and alerting the operator is disabled when the airbag activation is detected.

8. The vehicle system of claim 1, further comprising an illumination system operable for selectively illuminating the flank of the vehicle such that the plurality of separate images can be obtained when one or more of: a low illumination condition is detected and the one or more cameras are activated.

9. The vehicle system of claim 1, further comprising one or more of a steering wheel angle sensor and a yaw sensor operable for detecting an orientation of the vehicle and overlaying a current and predicted position and orientation of the vehicle on the virtual distance grid overlaid on the plurality of separate images on the display in the vehicle.

10. A vehicle method for displaying and detecting objects/obstacles in a flank of a vehicle, comprising:
    obtaining a plurality of separate images of the flank of the vehicle using a plurality of cameras, wherein the plurality of separate images of the flank of the vehicle comprise a side-facing image of the flank of the vehicle, a front-wheel view of the flank of the vehicle, and a rear-wheel view of the flank of the vehicle;
    removing distortion from the plurality of separate images, transforming the plurality of separate images, and overlaying a virtual distance grid simultaneously and consistently on each of the plurality of separate images including the side-facing image of the flank of the vehicle, the front-wheel view of the flank of the vehicle, and the rear-wheel view of the flank of the vehicle on a display in the vehicle;

detecting an object/obstacle within a predefined virtual safety envelope defined one or more of adjacent to and around the vehicle, wherein the detecting the object/obstacle comprises using one or more of the plurality of cameras and a proximity sensor;

alerting the operator to the object/obstacle within the predefined virtual safety envelope defined one or more of adjacent to and around the vehicle using a warning system;

wherein the plurality of separate images each capture an overlapping portion of the flank of the vehicle, and wherein the virtual distance grid is derived from at least one of a calibration parameter and a look-up table such that the virtual distance grid is simultaneously and consistently overlaid and displayed across the plurality of separate images;

predicting an immediate next position of the vehicle based on yaw angle or steering wheel angle and displaying the immediate next position consistently on each of the plurality of separate images simultaneously;

determining that the vehicle is in a parked gear and detecting and alerting the operator to a potential interaction between the object/obstacle and a door of the vehicle when the door is opened when the vehicle is in the parked gear based on a predetermined or expected opening distance of the door, wherein the determining that the vehicle is in the parked gear and detecting and alerting the operator to the potential interaction between the object/obstacle and the door of the vehicle when the door is opened when the vehicle is in the parked gear based on the predetermined or expected opening distance of the door is disabled when airbag activation is detected; and determining that the vehicle is in the parked gear and detecting and predicting a potential incursion of a moving object/obstacle into the flank of the vehicle when the vehicle is in the parked gear and alerting the operator.

11. The vehicle method of claim 10, wherein transforming the plurality of separate images comprises rotationally transforming the plurality of separate images.

12. The vehicle method of claim 10, wherein the plurality of separate images are displayed with the side-facing image of the flank of the vehicle disposed between the front-wheel view of the flank of the vehicle and the rear-wheel view of the flank of the vehicle.

13. The vehicle method of claim 10, wherein the virtual distance grid comprises at least one zone relatively closer to the vehicle and at least one zone relatively farther from the vehicle both displayed to a driver on the display in the vehicle, wherein the at least one zone relatively closer to the vehicle and the at least one zone relatively farther from the vehicle are both consistently overlaid and displayed across the plurality of separate images.

14. The vehicle method of claim 10, wherein the warning system comprises one or more of a visual warning system, an auditory warning system, and a haptic warning system.

15. Previously Presented): The vehicle method of claim 10, further comprising determining and displaying one or more of a present orientation of the vehicle and a future orientation of the vehicle on the plurality of separate images displayed to the operator.

16. The vehicle method of claim 10, wherein the determining that the vehicle is in the parked gear and detecting and predicting the potential incursion of the moving object/obstacle into the flank of the vehicle when the vehicle is in the parked gear and alerting the operator is disabled when the airbag activation is detected.

17. The vehicle method of claim 10, further comprising selectively illuminating the flank of the vehicle such that the plurality of separate images can be obtained when one or more of: a low illumination condition is detected and the one or more cameras are activated.

18. The vehicle method of claim 10, further comprising detecting an orientation of the vehicle and overlaying a current and predicted position and orientation of the vehicle on the virtual distance grid overlaid on the plurality of separate images on the display in the vehicle.

* * * * *